US012064755B2

(12) United States Patent
Kucmierczyk et al.

(10) Patent No.: US 12,064,755 B2
(45) Date of Patent: Aug. 20, 2024

(54) PROCESS FOR SEPARATING ONE OR MORE COMPONENTS FROM A MIXTURE

(71) Applicant: Evonik Oxeno GmbH & Co. KG, Marl (DE)

(72) Inventors: Peter Kucmierczyk, Herne (DE); Robert Franke, Marl (DE); Dirk Fridag, Haltern am See (DE); Johannes Knossalla, Schermbeck (DE); Marc Schäpertöns, Recklinghausen (DE); Frederik Gluth, Mülheim an der Ruhr (DE)

(73) Assignee: Evonik Oxeno GmbH & Co. KG, Marl (DE)

( * ) Notice: Subject to any disclaimer, the term of this patent is extended or adjusted under 35 U.S.C. 154(b) by 989 days.

(21) Appl. No.: 16/888,925

(22) Filed: Jun. 1, 2020

(65) Prior Publication Data
US 2020/0391194 A1 Dec. 17, 2020

(30) Foreign Application Priority Data
Jun. 12, 2019 (EP) ................... 19179573

(51) Int. Cl.
*B01D 61/00* (2006.01)
*B01D 71/02* (2006.01)
*B01D 71/38* (2006.01)
*B01J 31/40* (2006.01)
*B01J 38/60* (2006.01)
*B01J 38/00* (2006.01)

(52) U.S. Cl.
CPC ........ *B01J 31/4061* (2013.01); *B01D 71/025* (2013.01); *B01D 71/027* (2013.01); *B01D 71/381* (2022.08); *B01J 31/4053* (2013.01); *B01J 38/60* (2013.01)

(58) Field of Classification Search
CPC ........... C07C 7/144; C07C 7/20; C07C 45/00; C07C 45/61; C07C 45/77; C07C 45/78; C07C 45/786; C07C 2523/00; C07C 2523/38; C07C 2523/40; C07C 2523/42; C07C 2523/44; C07C 2523/46; B01D 37/00; B01D 37/03; B01D 63/00; B01D 53/86; B01D 61/00; B01D 61/027; B01D 61/04; B01D 61/16
USPC ......................................................... 210/639
See application file for complete search history.

(56) References Cited

U.S. PATENT DOCUMENTS

| 5,773,667 A | 6/1998 | Bahrmann et al. |
| 5,786,517 A | 7/1998 | Bryant et al. |
| 5,789,625 A | 8/1998 | Bryant et al. |
| 5,817,884 A | 10/1998 | Bahrmann |
| 5,922,634 A | 7/1999 | Bahrmann et al. |
| 6,020,532 A | 2/2000 | Bahrmann et al. |
| 8,748,643 B2 | 6/2014 | Priske et al. |
| 9,676,805 B2 | 6/2017 | Dyballa et al. |
| 9,688,604 B2 | 6/2017 | Jennerjahn et al. |
| 9,725,398 B2 | 8/2017 | Dong et al. |
| 9,845,276 B2 | 12/2017 | Franke et al. |
| 10,077,228 B2 | 9/2018 | Dong et al. |
| 10,155,200 B2 | 12/2018 | Geilen et al. |
| 10,202,329 B2 | 2/2019 | Dong et al. |
| 10,245,578 B2 | 4/2019 | Klasovsky et al. |
| 10,294,191 B2 | 5/2019 | Dong et al. |
| 10,501,392 B2 | 12/2019 | Fridag et al. |
| 10,562,833 B2 | 2/2020 | Fridag et al. |
| 10,577,297 B2 | 3/2020 | Fridag et al. |
| 10,633,302 B2 | 4/2020 | Nadolny et al. |
| 10,647,650 B2 | 5/2020 | Hecht et al. |
| 10,654,784 B2 | 5/2020 | Hasselberg et al. |
| 2004/0222169 A1* | 11/2004 | Yuan .................. B01D 67/0095 210/438 |
| 2009/0012323 A1 | 1/2009 | Van Rensburg et al. |
| 2016/0075825 A1 | 3/2016 | Ross et al. |
| 2016/0236150 A1* | 8/2016 | Geilen ..................... G06F 17/10 |
| 2016/0257634 A1 | 9/2016 | Dyballa et al. |
| 2017/0022138 A1 | 1/2017 | Dong et al. |
| 2019/0283003 A1 | 9/2019 | Nadolny et al. |
| 2019/0283004 A1 | 9/2019 | Nadolny et al. |
| 2019/0283005 A1 | 9/2019 | Nadolny et al. |
| 2020/0148621 A1* | 5/2020 | Lygin ...................... C07C 67/44 |

FOREIGN PATENT DOCUMENTS

| CA | 2936724 A1 * | 1/2017 | ............. B01J 31/12 |
| CN | 1173485 | 2/1998 | |
| CN | 1203574 | 12/1998 | |
| CN | 1203575 | 12/1998 | |
| CN | 101648971 | 2/2010 | |
| CN | 102333580 | 1/2012 | |
| CN | 105324413 | 9/2016 | |
| CN | 105938518 | 9/2016 | |

(Continued)

OTHER PUBLICATIONS

Harrington et al., Comprehensive Organometallic Chemistry II, Transition Metal Organometallics in Organic Synthesis, 8.3.3.5.3 From a 1,3-diene (Year: 1995).*
Sarioglan, Platinum Metals Rev., 2013, 57, (4), 289-296. (Year: 2013).*
English Machine Translation of CN109641862A (Year: 2019).*
Kucmierczyk et al., U.S. Appl. No. 16/893,463, filed Jun. 5, 2020.
Kucmierczyk et al., U.S. Appl. No. 16/893,481, filed Jun. 5, 2020.
Kucmierczyk et al., U.S. Appl. No. 16/888,920, filed Jun. 1, 2020.
European Search Report mailed on Dec. 19, 2019 in EP 19179573.1 (8 pages).
Burgal et al., "Organic Solvent resistant poly(ether-ether-ketone) nanofiltration membranes", Journal of Membrane Science, vol. 479, 2015, pp. 105-116.

(Continued)

*Primary Examiner* — Allison G Fitzsimmons
(74) *Attorney, Agent, or Firm* — Grüneberg and Myers PLLC

(57) ABSTRACT

The invention relates to a process for separating one or more components from a mixture by a membrane separation in which—depending on the component to be separated—an acid or a base is added to the mixture before the membrane separation.

20 Claims, No Drawings

(56) References Cited

FOREIGN PATENT DOCUMENTS

| | | | | |
|---|---|---|---|---|
| CN | 109641862 A | * | 4/2019 | .............. B01J 23/30 |
| CN | 109647527 A | * | 4/2019 | .......... B01J 31/2409 |
| DE | 10 2009 001230 A1 | | 9/2010 | |
| DE | 10 2013 107 911 A1 | | 1/2015 | |
| DE | 102017208303 A1 | * | 11/2018 | ............ B01J 31/143 |
| EP | 0 823 282 A2 | | 2/1998 | |
| EP | 3121184 | | 1/2017 | |
| WO | WO-2004076041 A1 | * | 9/2004 | ......... B01D 67/0072 |
| WO | 2013/107902 A1 | | 7/2013 | |
| WO | 2015/110843 A1 | | 7/2015 | |

OTHER PUBLICATIONS

Gaffen et al., A Simple and Effective Method of Determining Lewis Acidity by Using Fluorescence, Chem, vol. 5, Jun. 13, 2019, pp. 1567-1583.

Translation of Chinese Office Action and Search Report dated Jul. 25, 2023, for Chinese Application No. 202010528506.5, 13 pages.

* cited by examiner

PROCESS FOR SEPARATING ONE OR MORE COMPONENTS FROM A MIXTURE

CROSS REFERENCE TO RELATED APPLICATIONS

This application is a 35 U.S.C. § 119 patent application which claims the benefit of European Application No. 19179573.1 filed Jun. 12, 2019, which is incorporated herein by reference in its entirety.

FIELD

The present invention relates to a process for separating one or more components from a mixture by a membrane separation in which—depending on the component to be separated—an acid or a base is added to the mixture before the membrane separation.

BACKGROUND

Membrane separation processes are well known in the prior art and are used today in many fields of industry, for example for the recovery of homogeneous catalyst systems. There is fundamentally an ongoing need for improvements in membrane properties such as the retention or permeability of the membrane. The focus here typically is on modifying the membrane material with the aim of achieving the desired improvements, but a common drawback is the large amount of work and sizeable expenditure on development.

One proposal to reduce the amount of work and expenditure on development, was to improve the separation properties through the targeted addition of aromatic solvents. Thus, DE 10 2013 107 911 A1 discloses a membrane separation process in which a so-called organophilic nanofiltration (oNF) membrane was used to achieve an improvement in retention and/or permeability through the addition of at least 5% by weight of an aromatic solvent to a mixture from which a component was then separated by membrane separation. The aromatic solvent used therein is in particular toluene.

A disadvantage of the process described therein is that a not inconsiderable amount of solvent needs to be added. It is not possible to rule out here an effect on the component to be separated due to the increased concentration of solvents, for example an additional aromatic solvent such as toluene in this case. Another problem is that the solvent is not an intrinsic component of the system per se, which means that additional purification steps may be necessary.

Moreover, the aim, particularly in the case of homogeneous catalysis, is to recycle the retentate stream that contains the component to be separated into the reaction zone. As a result of the increased amounts of additional aromatic solvent, a not inconsiderable amount thereof is likewise retained by the membrane and ends up in the reactor via the retentate stream. An adverse effect on the reaction conditions due to the presence of an increased amount of solvent cannot be ruled out. Increased by-product formation also cannot be excluded. Even if by-product formation is absent, the additional solvent lowers the space-time yield in the reactor (depending on the amount added).

SUMMARY

The object of the present invention was accordingly to provide a process for separating one or more components from a mixture by a membrane separation that is not beset by the abovementioned disadvantages. The object was additionally to provide a membrane separation process in which the addition of the additional component may be reduced to a minimum, so that the recycling of the retentate stream has no noticeable effect on space-time yields, rates of by-product formation or reaction conditions and accordingly does not jeopardize the economic viability of the process.

The object underlying the present invention was achieved by the process according to Claim 1. Preferred embodiments are specified in the dependent claims.

DETAILED DESCRIPTION

The process according to the invention is a process for separating a homogeneous catalyst system that contains at least one metal from groups 8 to 10 of the periodic table of elements or a compound thereof and a phosphorus-containing ligand, from a reaction solution by a membrane separation that results in the homogeneous catalyst system being depleted in the resulting permeate stream and enriched in the resulting retentate stream, wherein
at least one component of the homogeneous catalyst system contains at least one acidic or basic functional group, preferably a basic functional group, characterized in that the reaction solution prior to the membrane separation contains an acid in an amount of ≥0.1% by weight, preferably in an amount of ≥0.1% by weight and <5% by weight, based on the total weight of the mixture, in the case of the at least one component to be separated having a basic functional group, or contains a base in an amount of ≥0.1% by weight, preferably in an amount of ≥0.1% by weight and <5% by weight, based on the total weight of the mixture, in the case of the at least one component to be separated having an acidic functional group.

The membrane separation is based on the semipermeability of the membrane material, which is permeable to certain substances and impermeable to others. The separation is normally via the molecular weight. In the present case, components having a molecular weight of 0.1 to 1 kDa can be separated from one another or from other low-molecular-weight components in the mixture. In the separation, components that have a molecular weight above a value defined by the membrane are enriched in the retentate, while all low-molecular-weight components are enriched in the permeate. Depending on the molecular weight of the component(s) to be separated, these components are enriched either in the permeate or in the retentate. In the process according to the invention, the component(s) to be separated are preferably enriched in the retentate.

Any suitable membrane material may in principle be used in the process according to the invention. However, the addition of acid or base to the mixture in accordance with the invention means that the membrane should at least be acid and/or base stable or at least stable to the acids or bases used. In the context of the present invention, the terms "acid stable" and "base stable" mean that, in the presence respectively of acid and base, in particular a Brønsted acid having a pKa ≤5, more preferably having a pKa ≤3, or a Lewis acid having a LAU value of more than 25, preferably having an LAU value of 29, the membrane material is stable for at least 300 h without being destroyed and thereby being no longer able to achieve the actual separation effect. Such a membrane material preferably consists at least of a relatively thin separation-active layer (also: active separation layer) and optionally a thicker backing on which the separation-active layer is located. The membrane material according to the invention preferably consists at least of a separation-active layer and a backing. One or more intermediate layers may be present between the separation-active layer and the backing. In a preferred embodiment, the membrane material consists only of the separation-active layer and the backing.

The membrane material preferably includes as a separation-active layer a polymer-based material selected from the group consisting of polyimide (PI), polydimethylsiloxane (PDMS), polyetherimide (PEI), poly(2,6-dimethyl-1,4-phenylene oxide) (PPO), polyvinyl alcohol (PVA), polyacrylic acid (PAA), polyurethanes (PU), poly(1-trimethylsilyl-1-propyne) (PTMSP), polybenzimidazoles (PBI), polydicyclopentadienes (pDCPD), polyaryl ether ketones (PAEK), for example polyether ether ketone (PEEK) and mixtures of these materials.

In particular, the backing has a porous structure that is permeable to the permeate that has passed through the separation-active layer. The backing has a stabilizing function and serves as a support for the separation-active layer. The backing may in principle be composed of any suitable porous material. However, a prerequisite is that the material is stable to acids and bases. The backing may also be composed of the same material as the separation-active layer.

The separation-active layer according to the invention is preferably composed of a PAEK (polyaryl ether ketone) polymer. PAEK has the particular feature that, within the repeat unit, aryl groups are linked alternately via an ether functionality and a ketone functionality. A preferred separation-active layer according to the invention is composed of PEEK (polyether ether ketone). As the separation-active layer, particular preference is given to using PEEK polymers having a degree of sulfonation of less than 20%, particularly preferably having a degree of sulfonation of less than 10%. The corresponding PEEK polymers and the preparation thereof are described in WO 2015/110843 A1 or in J. da Silva Burgal et al.; Journal of Membrane Science, vol. 479 (2015), pp. 105-116. This material has surprisingly been found to be particularly stable, particularly also towards acids or bases. In addition, a particular feature of the PEEK material according to the invention is that, when used as a separation-active layer, it allows the esters that are formed to pass through preferentially, whereas even the alcohols used as reactants are at least partially retained and thereby accumulate in the retentate. This allows the subsequent processing of the residual product mixture to be carried out more economically and for longer, because less alcohol needs to be removed compared with known membrane materials.

Alternatively, the membrane material for the process according to the invention may also be a ceramic membrane material. Examples of suitable ceramic membrane materials are aluminium oxide, $SiO_2$, $TiO_2$, $ZrO_2$ or mixtures of these materials, with the ceramic membrane material preferably being composed of these materials. The ceramic membrane materials may also include/have a functionalization, for example a surface modification. These membrane materials may be purely ceramic and be composed of the materials mentioned. On the other hand, the above-mentioned ceramic materials may likewise form the substrate/backing onto which a separation-active layer made of the abovementioned polymer materials is applied.

The membrane separation, i.e. particularly the construction of the corresponding equipment and the properties such as pressure and temperature, depend on the mixture used and on the component(s) to be separated therefrom. These parameters are in principle known to those skilled in the art. The membrane separation process according to the invention may be carried out as a single-step or multistep process.

The membrane separation is preferably carried out at a temperature between 25 and 100° C., more preferably between 30 and 80° C. and particularly preferably between 40 and 70° C. To bring the mixture to the prevailing temperature preferred for the membrane separation, the mixture may be cooled. In addition to active cooling using a coolant, cooling may also be achieved via a heat exchanger, whereby another stream is heated within the process according to the invention. There is also optionally a degassing step between the reaction and the membrane separation for preliminary removal from the mixture of highly volatile compounds. The mixture is first depressurized below the partial pressure of the dissolved components so that they are displaced from solution in order to then raise the pressure to that specified for the membrane separation.

The transmembrane pressure (TMP) in the membrane separation may be 10 to 60 bar, preferably 15 to 55 bar, more preferably 20 to 50 bar (relative). The permeate-side pressure may here be above atmospheric pressure up to 15 bar, preferably 3 to 7 bar, which then gives rise to the retentate-side pressure brought about by the TMP. In a preferred embodiment, care should be taken, in the case of the pressure ratios and the permeate-side pressure in particular, to ensure that the pressure is set according to the components in the mixture and the temperature in the system in order to avoid evaporation after passage through the membrane, since this could make the entire operation unstable. The same applies in principle also to dissolved, for example gaseous, components that may optionally be removed by the degassing step already mentioned.

For characterization of the permeability or separation performance of a membrane in membrane technology, the retention R of the membrane in respect of a specific component of the substance mixture is defined according to the following formula (1):

$$R = 1 - w_{(i)P}/w_{(i)R} \qquad (1),$$

where $w_{(i)P}$ is the mass fraction of the relevant component in the permeate and $w_{(i)R}$ is the mass fraction of the relevant component in the membrane retentate. The retention may thus have a value from 0 to 1 and is therefore preferentially stated in %. A retention of 0% means that the relevant component permeates unhindered through the membrane, with the result that the mass fractions of the components in the retentate are the same as in the permeate. Conversely, a retention of 100% means that the relevant component is retained completely by the membrane, but this is almost impossible industrially.

In addition to the retention, the so-called permeability of the membrane is also key to the characterization of its permeability according to the following formula (2):

$$P = m'/A * TMP \qquad (2),$$

where m' represents the mass flow of the permeate, A the surface area of the membrane and TMP the applied transmembrane pressure. The permeability is usually stated in units of $kg/(h*m^2*bar)$.

As regards characterization of the stability of a membrane, a relative change in the permeability $P_{Rel}$ can be defined according to the following formula (3):

$$P_{Rel} = P_{t=x}/P_{t=0} \qquad (3),$$

where $P_{t=x}$ represents the permeability at time t=x and $P_{t=0}$ the original permeability at time t=0 (a different reference time is also possible, with the proviso that t=x>t=y).

The membrane separation process according to the invention has the particular feature that an acid or a base in an amount of ≥0.1% by weight based on the total weight of the mixture is added to the mixture containing the component(s) to be separated. An acid is added to the mixture if the component(s) to be separated contain at least one basic functional group. Conversely, a base is added to the mixture if the component(s) to be separated contain at least one acidic functional group. The amount of acid or base is preferably limited to an amount of <5% by weight so as not to introduce too high a proportion of components intrinsic to the system and so as not to cause undue dilution of the mixture.

If an acid is added to the mixture, the acid may be a Brønsted or Lewis acid. Suitable Brønsted acids are perchloric acid, sulfuric acid, phosphoric acid, methylphosphonic acid or a sulfonic acid, for example methanesulfonic acid, trifluoromethanesulfonic acid, tert-butanesulfonic acid, p-toluenesulfonic acid (pTSA), 2-hydroxypropane-2-sulfonic acid, 2,4,6-trimethylbenzenesulfonic acid or dodecylsulfonic acid. The Brønsted acid used is preferably sulfuric acid or a sulfonic acid, more preferably sulfuric acid. Suitable Lewis acids are titanium(IV) isopropoxide, $Bu_2SnO$, BuSn(O)OH, aluminium triflate, aluminium chloride, aluminium hydride, trimethylaluminium, tris(pentaflurophenyl)borane, boron trifluoride, boron trichloride or mixtures thereof. Preference is given to using titanium(IV) isopropoxide and aluminium triflate as Lewis acids.

If a base is added to the mixture, the base used may be selected from the group consisting of alkali metals, alkali metal oxides, alkali metal or alkaline earth metal acetates, alkali metal or alkaline earth metal oxides, alkali metal or alkaline earth metal alkoxides, such as NaEtOH or MgEtOH, and alkali metal carbonates such as $K_2CO_3$ or $Cs_2CO_3$. Basic ion exchangers or NaOH may, however, also be used. Preference is given to using Na or Mg alkoxides such as NaEtOH or MgEtOH.

In the present invention, the component to be separated is a homogeneous catalyst system that needs to be separated from the reaction solution. The reaction solution originates from a hydroformylation or an alkoxycarbonylation.

Alkoxycarbonylation means the usually homogeneously catalyzed reaction of a hydrocarbon having at least one olefinic double bond with carbon monoxide and an alcohol to form an ester. Hydroformylation means the usually homogeneously catalyzed reaction of a hydrocarbon that has at least one multiple bond, preferably at least one olefinic double bond, with synthesis gas (mixture of CO and $H_2$) to form an aldehyde.

Both alkoxycarbonylation and hydroformylation are carried out using a hydrocarbon having at least one multiple bond, in particular hydrocarbons having one olefinic double bond. There is in principle no limit to the number of carbon atoms in the compound having at least one multiple bond, preferably at least one olefinic double bond. Preference is given to C2 to C20 hydrocarbons having at least one olefinic double bond. In a preferred embodiment of the present invention, C3 to C16 hydrocarbons, more preferably C3 to C12 hydrocarbons, having at least one multiple bond, preferably at least one olefinic double bond, may be used. These include in particular n-alkenes, isoalkenes, cycloalkenes and aromatic alkenes having 2 to 20 carbon atoms, preferably 3 to 16 carbon atoms, more preferably 3 to 12 carbon atoms.

The hydrocarbons described above may contain one or more further functional groups in addition to the at least one olefinic double bond. Examples of suitable functional groups are carboxyl, thiocarboxyl, sulfo, sulfinyl, carboxylic anhydride, imide, carboxylic ester, sulfonic ester, carbamoyl, sulfamoyl, cyano, carbonyl, carbonothioyl, hydroxyl, sulfhydryl, amino, ether, thioether, aryl, heteroaryl or silyl groups and/or halogen substituents.

Particularly preferred hydrocarbons used in hydroformylation or alkoxycarbonylation have only one olefinic double bond, in particular n-alkenes and isoalkenes having 2 to 20 carbon atoms, preferably 3 to 16 carbon atoms, more preferably 3 to 12 carbon atoms. The hydrocarbons used are preferably unsubstituted.

The alcohol used in the alkoxycarbonylation is a mono- or polyol (two or more OH groups) having 1 to 50 carbon atoms, preferably having 1 to 15 carbon atoms, more preferably having 1 to 10 carbon atoms, or a mixture of two or more mono- and/or polyols. In a preferred embodiment, the polyol is a diol, triol or tetraol, preferably a diol or triol, having the abovementioned number of carbon atoms. Suitable alcohols for the alkoxycarbonylation are methanol, ethanol, 1-propanol, 1-butanol, 1-pentanol, 1-hexanol, 2-propanol, tert-butanol, 3-pentanol, 2-propylheptanol, cyclohexanol, phenol or mixtures thereof, preferably ethanol, 1-propanol, 1-butanol, 1-pentanol, 1-hexanol, 2-propanol, tert-butanol, 3-pentanol, 2-propylheptanol.

The alcohol used in the alkoxycarbonylation, when it is a monool, is used in a molar ratio to the hydrocarbon used (monool:hydrocarbon) of 2 to 20, preferably of 3 to 10 and more preferably of 4 to 6. The monool is thus added in a molar excess based on the hydrocarbon used. The alcohol may accordingly serve both as a reactant for the carbonylation and as a solvent. The alcohol used in the alkoxycarbonylation, when it is a polyol, is used in a molar ratio to the hydrocarbon used (hydrocarbon:polyol) of 2 to 20, preferably of 3 to 10 and more preferably of 4 to 8. The polyol is thus added in a molar deficit based on the hydrocarbon used.

Both reactions, i.e. hydroformylation and alkoxycarbonylation, use homogeneous catalyst systems that in each case comprise a metal from groups 8 to 10 of the periodic table of the elements (PTE), or a compound thereof, and a phosphorus-containing ligand.

For alkoxycarbonylation, the homogeneous catalyst system preferably comprises at least one metal from group 8 to 10 of the periodic table of the elements (PTE) or a compound thereof, a phosphorus-containing ligand and optionally an acid as co-catalyst.

The metal from group 8 to 10 of the PTE is preferably palladium. The palladium is preferably used in the form of a precursor compound as a palladium compound coordinated by the phosphorus-containing ligand. Examples of palladium compounds that may be used as precursor compounds are palladium chloride [$PdCl_2$], palladium(II) acetylacetonate [$Pd(acac)_2$], palladium(II) acetate [$Pd(OAc)_2$], dichloro(1,5-cyclooctadiene)palladium(II) [$Pd(cod)Cl_2$], bis(dibenzylideneacetone)palladium(0) [$Pd(dba)_2$], tris(dibenzylideneacetone)dipalladium(0) [$Pd_2(dba)_3$] bis(acetonitrile)dichloropalladium(II) [$Pd(CH_3CN)_2Cl_2$], palladium (cinnamyl)dichloride [$Pd(cinnamyl)Cl_2$]. Preference is given to using the compounds [$Pd(acac)_2$] or [$Pd(OAc)_2$]. The concentration of palladium metal in the alkoxycarbonylation is preferably between 0.01 and 0.6 mol %, preferably between 0.03 and 0.3 mol %, more preferably between 0.04 and 0.2 mol %, based on the molar amount of the hydrocarbon used.

Suitable phosphorus-containing ligands of the catalyst system according to the invention for the alkoxycarbonylation preferably have a mono- or bidentate structure, preferably a bidentate structure. Preferred phosphorus-containing ligands for the catalyst system according to the invention are benzene-based diphosphine compounds, as disclosed, for example, in EP 3 121 184 A2. The ligands may be combined with the palladium in a preliminary reaction so that the palladium-ligand complex is fed into the reaction zone or added to the reaction in situ and combined with the palladium there. The molar ratio of ligand to metal in the alkoxycarbonylation may be 1:1 to 10:1, preferably 2:1 to 6:1, more preferably 3:1 to 5:1.

The homogeneous catalyst system preferably comprises an acid, in particular a Brønsted acid or a Lewis acid. Lewis acids used may in particular be Lewis acids having an LAU value of more than 25, preferably having an LAU value of 29. The LAU value is a method for determining the strength of Lewis acids (J R Gaffen et al., Chem, vol. 5, issue 6, p. 1567-1583). Lewis acids used are preferably aluminium triflate, aluminium chloride, aluminium hydride, trimethylaluminium, tris(pentafluorophenyl)borane, boron trifluoride, boron trichloride or mixtures thereof. Of the Lewis acids mentioned, preference is given to using aluminium triflate. The Lewis acid is preferably added in a molar ratio of Lewis acid to ligand of 1:1 to 20:1, preferably 2:1 to 15:1, more preferably 5:1 to 10:1.

Suitable Brønsted acids preferably have an acid strength pKa of ≤5, more preferably an acid strength pKa of ≤3. The stated acid strength pKa refers to the pKa determined under standard conditions (25° C., 1.01325 bar). For polyprotic acids, the acid strength pKa in the context of this invention relates to the pKa of the first protolysis step. The Brønsted acid is preferably added in a molar ratio of Brønsted acid to ligand of 1:1 to 15:1, preferably 2:1 to 10:1, more preferably 3:1 to 5:1.

The Brønsted acid used may in particular be perchloric acid, sulfuric acid, phosphoric acid, methylphosphonic acid or sulfonic acids. Examples of suitable sulfonic acids are methanesulfonic acid, trifluoromethanesulfonic acid, tert-butanesulfonic acid, p-toluenesulfonic acid (PTSA), 2-hydroxypropane-2-sulfonic acid, 2,4,6-trimethylbenzenesulfonic acid and dodecylsulfonic acid. Particularly preferred acids are sulfuric acid, methanesulfonic acid, trifluoromethanesulfonic acid and p-toluenesulfonic acid. The acid is preferably sulfuric acid.

The acid as co-catalyst of the homogeneous catalyst system may in principle take on the role of the acid in the process according to the invention. It is important that the acid is present in the amount of ≥0.1% by weight necessary for the process. To achieve this, acid may still be added after the reaction, but before entry into the membrane separation.

For hydroformylation, the homogeneous catalyst system preferably comprises a metal from group 8 or 9 of the periodic table of the elements (PTE) and at least one phosphorus-containing ligand.

The phosphorus-containing ligand for the catalyst system for the hydroformylation preferably has the general formula (I)

$$R'\text{-}A\text{-}R''\text{-}A\text{-}R'''$$ (I)

where R', R" and R''' are each organic radicals, with the proviso that R' and R''' are non-identical, and both A are each a bridging —O—P(—O)$_2$ group, wherein two of the three oxygen atoms —O— are each attached to the radical R' and to the radical R'''.

In a preferred embodiment, R', R" and R''' in the compound of the formula (VI) are preferably selected from substituted or unsubstituted 1,1'-biphenyl, 1,1'-binaphthyl and ortho-phenyl groups, especially from substituted or unsubstituted 1,1'-biphenyl groups, with the proviso that R' and R''' are non-identical. More preferably, the substituted 1,1'-biphenyl groups have an alkyl group and/or an alkoxy group in the 3,3' and/or 5,5' positions of the 1,1'-biphenyl base skeleton, especially a C1-C4 alkyl group, more preferably a tert-butyl and/or methyl group, and/or preferably a C1-C5 alkoxy group, more preferably a methoxy group. The metals used may be iron, iridium, ruthenium, cobalt or rhodium in particular, preferably cobalt or rhodium; these may also be used in the form of precursor compounds thereof.

The hydrocarbons used are reacted in the presence of the respective homogeneous catalyst system with carbon monoxide and an alcohol (alkoxycarbonylation) or with synthesis gas only (hydroformylation) and converted thereby into an ester (alkoxycarbonylation) or an aldehyde (hydroformylation). The reaction conditions are known to those skilled in the art.

In both reactions, the carbon monoxide may be provided directly as a feed mixture or by adding a carbon monoxide-containing gas selected from synthesis gas, water gas, generator gas and other carbon monoxide-containing gases. Synthesis gas is normally used in hydroformylation. In alkoxycarbonylation, it is also possible to provide the carbon monoxide by first separating the carbon monoxide-containing gas into its components in a manner known to those skilled in the art and passing the carbon monoxide into the reaction zone. The carbon monoxide may still contain a certain proportion of hydrogen or other gases, because complete separation is almost impossible.

Alkoxycarbonylation affords as a product mixture a reaction solution that comprises at least the ester formed by the reaction, the homogeneous catalyst system, low boilers, for example low-boiling by-products such as ethers, high boilers, unreacted alcohols and unreacted hydrocarbons. The product mixture is then fed into the subsequent membrane separation.

Hydroformylation affords as a product mixture a reaction solution that comprises at least the aldehyde formed by the reaction, the homogeneous catalyst system, low boilers, high boilers, for example acetals, and unreacted hydrocarbons. The product mixture is then fed into the subsequent membrane separation.

EXAMPLES

Example 1

Increase in Membrane Retention for Various Membrane Materials

The tests were carried out in a commercially available dead-end batch-filtration cell of the METcell model from Evonik MET with two commercially available membranes from Evonik (Evonik DuraMem 300, polyimide-based) and Borsig (Borsig oNF-2, polydimethylsiloxane-based). The PEEK membrane according to the invention was produced in accordance with the publication J. da Silva Burgal et al.;

Journal of Membrane Science, vol. 479 (2015), pp. 105-116 (see also WO 2015/110843 A1).

Tests were carried out under the following conditions: 56.7 cm² active membrane surface area, 20 bar transmembrane pressure, 250 rpm stirrer speed.

The principal constituents of the mixture investigated are methanol in a content of 43% by weight and methyl octanoate in a content of 57% by weight. To determine the retention, the ligand 4,4'-di-tert-butyl-2,2'-dipyridyl (44tB22) was added to the test mixture in a content of 0.01% by weight. A first measurement was then carried out. 0.5% by weight of aluminium triflate (based on the total weight of the mixture) was then added as acid and the measurement of permeability and retention was repeated.

The METcell was filled with 200 ml of the above mixture, the operating pressure was then applied and 100 ml of permeate was then driven out, with continuous recording of the permeate weight. At the end of the test, once 100 ml of permeate had permeated out of the METcell through the membrane, samples were taken for GC and HPLC analyses. The reported permeability is an average across the 100 ml of permeate collected. After each run of the METcell, the permeate driven out was returned to the METcell, i.e. the permeate was mixed again with the residual retentate in the cell.

The retention was determined by HPLC-UV on a C18 column. Any method known to those skilled in the art in which the individual components of the mixture are reliably separated by chromatography and can thus be distinguished is suitable for the analysis.

TABLE 1

Comparison of permeability

| Example | Membrane | Ligand | Acid | w(acid) | $P_{0\ (before\ addition)}$ $L/m^2h^1bar^1$ | $P_{(after\ addition)}$ $L/m^2h^1bar^1$ |
|---|---|---|---|---|---|---|
| I | PEEK | 44tB22 | Al(OTf)₃ | 0.5% by wt. | 0.3 | 0.3 |
| II | Borsig oNF-2 | 44tB22 | Al(OTf)₃ | 0.5% by wt. | 0.7 | 1.6 |
| III | PuraMem S | 44tB22 | Al(OTf)₃ | 0.5% by wt. | 0.7 | 2.0 |

TABLE 2

Comparison of membrane retention

| Example | Membrane | Ligand | Acid | w(acid) | $R_{0\ (before\ addition)}$ % | $R_{(after\ addition)}$ % |
|---|---|---|---|---|---|---|
| I | PEEK | 44tB22 | Al(OTf)₃ | 0.5% by wt. | 54 | 81 |
| II | Borsig oNF-2 | 44tB22 | Al(OTf)₃ | 0.5% by wt. | 20 | 94 |
| III | PuraMem S | 44tB22 | Al(OTf)₃ | 0.5% by wt. | 57 | 78 |

The examples show clearly that membrane retention is increased by addition of an acid, irrespective of the membrane material used. Whereas the permeability of the type oNF-2 and PuraMem S membranes initially shows an increase that is advantageous in principle, stability problems become apparent in the long term. The PEEK membrane shows both a considerable increase in the retention of the component to be retained and acceptable permeability that does not change appreciably as a result of the addition of acid.

Example 2

Increase in Membrane Retention for Various Phosphine Ligands with the PEEK Membrane The tests were carried out in a continuously operated test system with complete recycling of the permeate in a closed loop. The system essentially comprises a high-pressure through-flow loop pressurizable up to 60 bar having a flat-channel membrane cell. The loop is fed from a reservoir filled with a feed solution that is mechanically mixed and blanketed with argon. An HPLC pump is used to bring the feed solution to the operating pressure of the membrane loop and thus to the high-pressure region of the test system. The high-pressure region of the test system consists essentially of a liquid loop, which is operated by means of a circulation pump, and a flat-membrane test cell and also the necessary sensors (e.g. pressure measurement, temperature measurement). The liquid flow penetrating through the membrane is withdrawn from the membrane module as permeate and recycled into the reservoir. The amount of permeate is measured on a balance. The excess feed volume (supply stream to the high-pressure pump minus the total permeate of the membrane) is likewise recycled into the reservoir. This recycling is effected by means of a mechanical supply pressure regulator, which is also used to set the supply pressure for the nanofiltration stage. The loop is heated by means of a thermostat in order to ensure a defined temperature for the separation.

The tests were carried out under the following conditions: active membrane surface area per module 84.5 cm², transmembrane pressure 45 bar, separation temperature 50° C. The membrane material used was PEEK (produced in accordance with example 1).

A feed solution consisting of 43% by weight of methanol and 57% by weight of methyl octanoate (molar ratio 4:1) was investigated. Determination of the retention was carried out using in each case 0.1% of the phosphine ligands listed in table 3. The retention for the ligands was first determined over a period of 70 h. 0.5% by weight of aluminium triflate (based on the total weight of the mixture) was then added as the acid and the retention measurement was repeated. The retention of the ligands was determined by HPLC with UV detector (220 nm) on a $C_{18}$ column.

TABLE 3

Comparison of the retention of various phosphine ligands with aluminium triflate

| Example | Ligand | $R_0$ (before addition) % | $R$ (after addition) % |
|---|---|---|---|
| IV | Diphenyl(2-pyridyl)phosphine | 60 | 85 |
| V | 1,2-Bis[(2-pyridyl)tert-butylphosphinomethyl]benzene | 80 | 92 |
| VI | 1,1-Bis[(2-pyridyl)tert-butylphosphinomethyl]ferrocene | 80 | 95 |
| VII | 2,6-Bis(di-tert-butylphosphinomethyl)pyridine | 80 | 99 |

Table 3 shows that an increase in retention occurs after addition of acid, irrespective of the ligand structure and of the number of phosphorus centres.

Example 3

The entire test procedure was repeated in accordance with example 2, but with addition of sulfuric acid instead of aluminium triflate. The results are shown in table 4.

TABLE 4

Comparison of the retention of various phosphine ligands with sulfuric acid

| Example | Ligand | | $R_{0\ (before\ addition)}$ % | $R_{(after\ addition)}$ % |
|---|---|---|---|---|
| IV | Diphenyl(2-pyridyl)phosphine | | 59 | 84 |
| V | 1,2-Bis[(2-pyridyl)tert-butylphosphinomethyl]benzene | | 80 | 93 |
| VI | 1,1-Bis[(2-pyridyl)tert-butylphosphinomethyl]ferrocene | | 79 | 95 |

TABLE 4-continued

Comparison of the retention of various phosphine ligands with sulfuric acid

| Example | Ligand | | $R_0$ (before addition) % | $R$ (after addition) % |
|---------|--------|---|---------------------------|------------------------|
| VII | 2,6-Bis(di-tert-butylphosphinomethyl)pyridine | 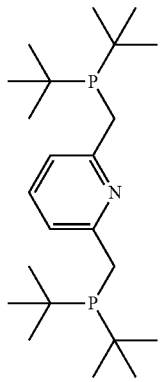 [SMILES: CC(C)(C)P(Cc1cccc(CP(C(C)(C)C)C(C)(C)C)n1)C(C)(C)C] | 81 | 99 |

Table 4 shows that an increase in ligand retention occurs for sulfuric acid to the same degree.

The invention claimed is:

1. A process for separating a homogeneous catalyst system that contains at least one metal from groups 8 to 10 of the periodic table of elements or a compound thereof and a phosphorus-containing ligand, from a reaction solution by a membrane separation, the process comprising:
adding an acid to the reaction solution, to obtain a mixture, and
separating the mixture by membrane separation, to result in the homogeneous catalyst system being depleted in the resulting permeate stream and enriched in a resulting retentate stream,
wherein at least one component of the homogeneous catalyst system contains at least one basic functional group,
wherein the acid is added in an amount of ≥0.1% by weight, based on the total weight of the mixture, wherein the at least one component to be separated has a basic functional group, and
wherein the acid is a Brønsted or Lewis acid, the Brønsted acid being selected from the group consisting of perchloric acid sulfuric acid, phosphoric acid, methylphosphonic acid or a sulfonic acid and the Lewis acid being selected from the group consisting of aluminium triflate, aluminium chloride, aluminium hydride, trimethylaluminium, tris(pentaflurophenyl)borane, boron trifluoride, boron trichloride, titanium(IV) isopropoxide, BU$_2$SnO, BuSn(O)OH, or mixtures thereof.

2. The process according to claim 1, wherein the acid is added to the mixture in an amount of ≥0.1% by weight and <5% by weight.

3. The process according to claim 1, wherein the acid is a Lewis acid selected from the group consisting of aluminium triflate, aluminium chloride, aluminium hydride, trimethylaluminium, tris(pentafluorophenyl)borane, boron trifluoride, boron trichloride, and mixtures thereof.

4. The process according to claim 1, wherein the acid is a Brønsted or Lewis acid, the Brønsted acid being selected from the group consisting of perchloric acid, phosphoric acid, methylphosphonic acid or a sulfonic acid and the Lewis acid being selected from the group consisting of aluminium triflate, aluminium chloride, aluminium hydride, trimethylaluminium, tris(pentaflurophenyl)borane, boron trifluoride, boron trichloride, titanium(IV) isopropoxide, Bu$_2$SnO, BuSn(O)OH, or mixtures thereof.

5. The process according to claim 1, wherein the phosphorus-containing ligand of the homogeneous catalyst system has a mono- or bidentate structure.

6. The process according to claim 1, wherein the phosphorus-containing ligand is a benzene-based diphosphine compound.

7. The process according to claim 1, wherein a ceramic membrane material is used in the membrane separation.

8. The process according to claim 7, wherein the ceramic membrane material comprises or consists of aluminium oxide, SiO$_2$, TiO$_2$, ZrO$_2$ or mixtures of these materials.

9. The process according to claim 1, wherein a polymer-based membrane material is used in the membrane separation and wherein the polymer-based membrane material includes at least one separation-active layer.

10. The process according to claim 9, wherein the polymer-based material as the separation-active layer includes a material selected from the group consisting of polyimide (PI), polydimethylsiloxane (PDMS), polyetherimide (PEI), poly(2,6-dimethyl-1,4-phenylene oxide) (PPO), polyvinyl alcohol (PVA), polyacrylic acid (PAA), polyurethanes (PU), poly(1-trimethylsilyl-1-propyne) (PTMSP), polybenzimidazoles (PBI), polydicyclopentadienes (pDCPD), polyaryl ether ketones (PAEK) and mixtures of these materials.

11. The process according to claim 1, wherein the separation-active layer is composed of a PAEK polymer.

12. The process according to claim 11, wherein the separation-active layer is composed of PEEK.

13. The process according to claim 1, wherein the reaction solution is from an alkoxycarbonylation reaction, and wherein, in the alkoxycarbonylation, a C2 to C20 hydrocarbon having at least one olefinic double bond is reacted with an alcohol and carbon monoxide in the presence of the homogeneous catalyst system.

14. The process according to claim 13, wherein the alcohol used in the alkoxycarbonylation is a mono- or polyol (two or more OH groups) having 1 to 50 carbon atoms or a mixture of two or more mono- and/or polyols.

15. The process according to claim 1, wherein the acid is a Brønsted acid having a pKa ≤3, or a Lewis acid selected from the group consisting of aluminium triflate, aluminium chloride, aluminium hydride, trimethylaluminium, tris(pentafluorophenyl)borane, boron trifluoride, boron trichloride, and mixtures thereof.

16. The process according to claim 1, wherein the acid is said Lewis acid, and
   wherein the Lewis acid is added in a molar ratio of Lewis acid to ligand of 1:1 to 20:1.

17. The process according to claim 12, wherein the separation-active layer has a degree of sulfonation of less than 20%.

18. The process according to claim 1, wherein the at least one metal is palladium.

19. The process according to claim 1, wherein the acid is aluminium triflate.

20. The process according to claim 1, wherein a base and a solvent are not added to the reaction solution.

* * * * *